March 4, 1952 — C. S. McCARTHY — 2,588,027
BRAKE ACTUATOR
Filed Sept. 26, 1949 — 4 Sheets-Sheet 1
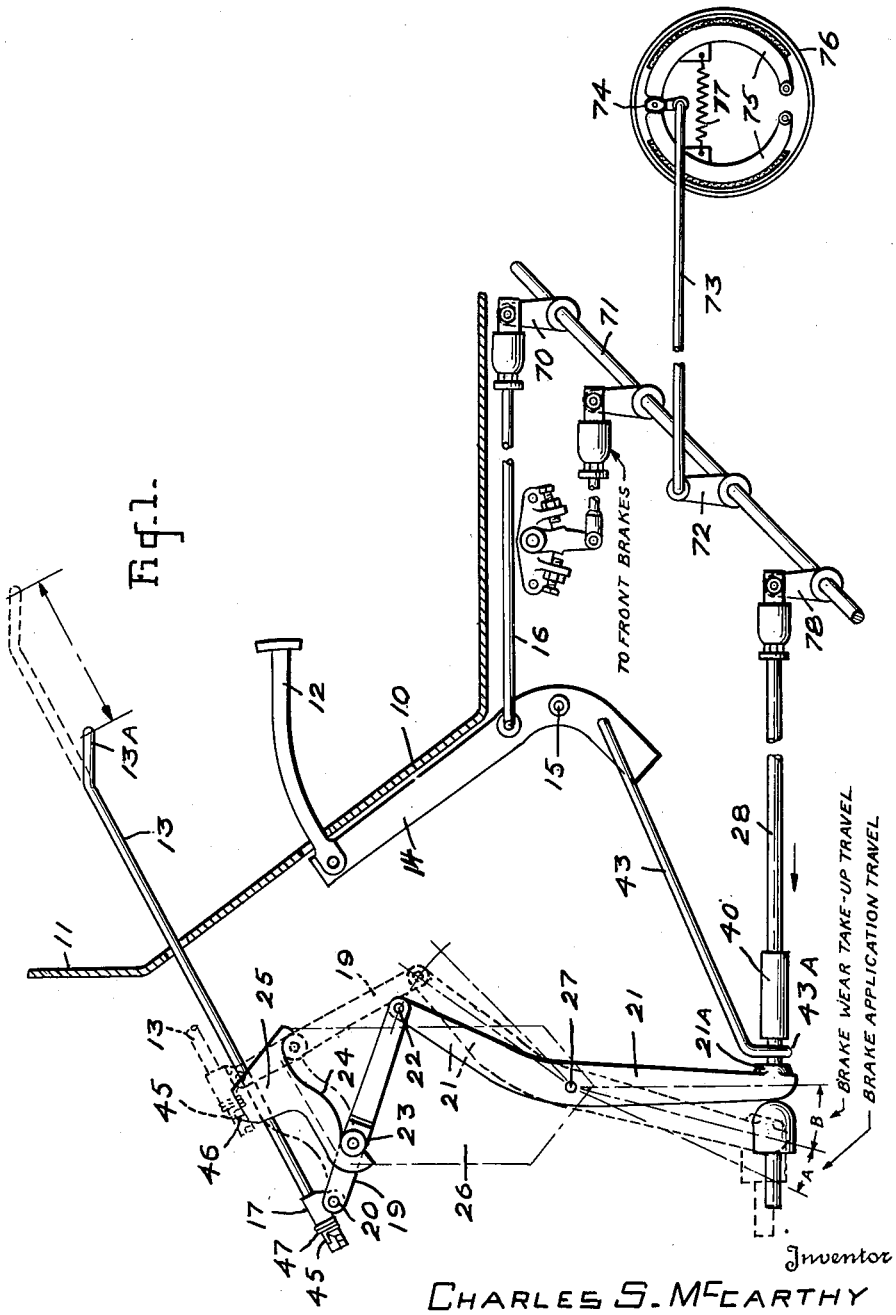
Inventor
CHARLES S. McCARTHY
By George Rex Frye
ATTORNEY March 4, 1952 C. S. McCARTHY 2,588,027
BRAKE ACTUATOR
Filed Sept. 26, 1949 4 Sheets-Sheet 2
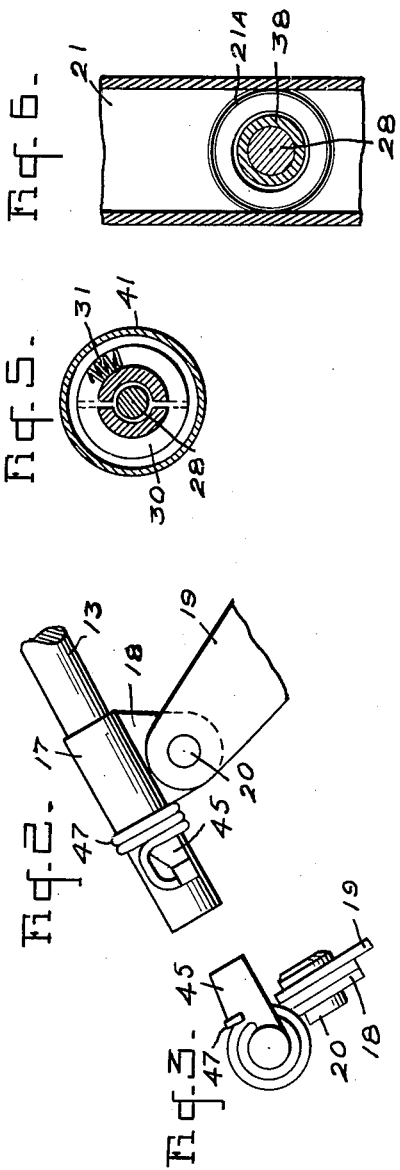
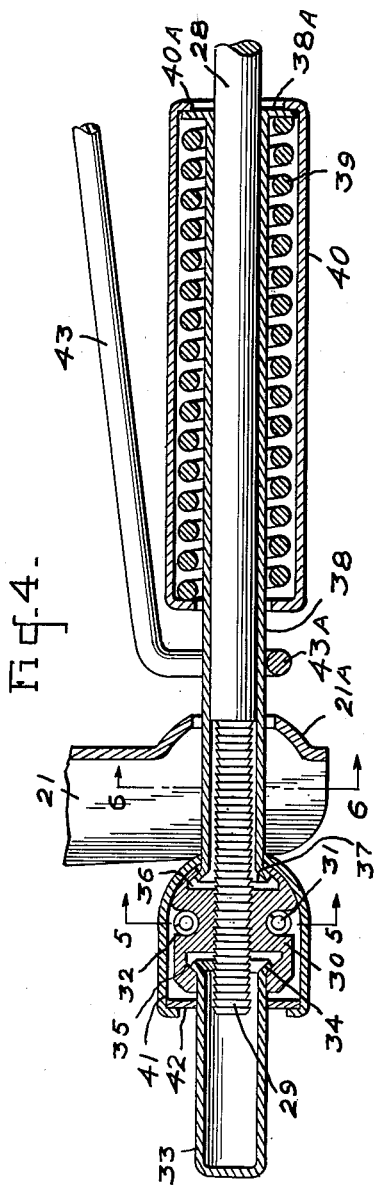
Inventor
CHARLES S. McCARTHY
By George Rex Frye
ATTORNEY March 4, 1952 C. S. McCARTHY 2,588,027
BRAKE ACTUATOR
Filed Sept. 26, 1949 4 Sheets-Sheet 3
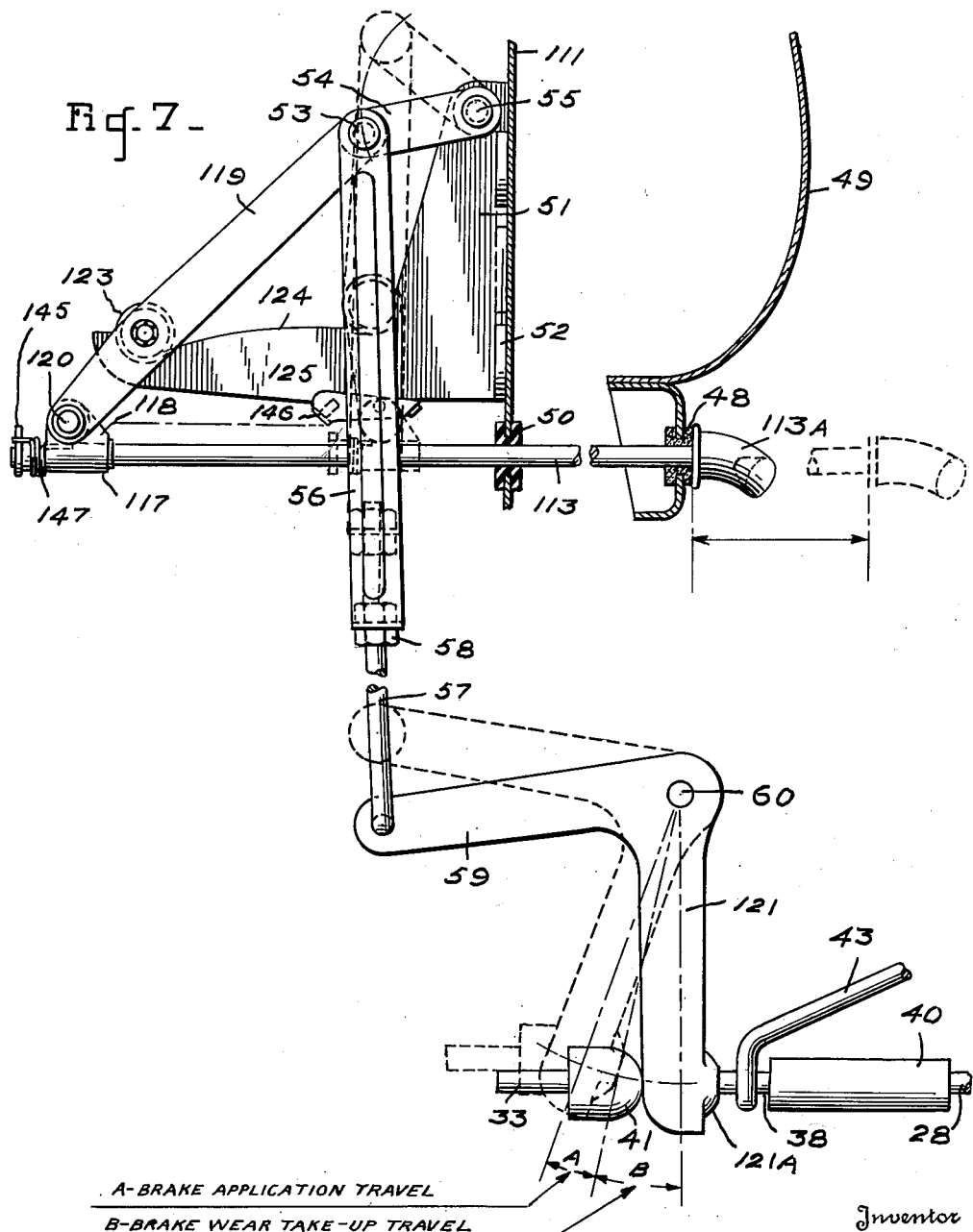
Inventor
CHARLES S. McCARTHY
By George Rex Frye
ATTORNEY March 4, 1952     C. S. McCARTHY     2,588,027
BRAKE ACTUATOR
Filed Sept. 26, 1949     4 Sheets-Sheet 4
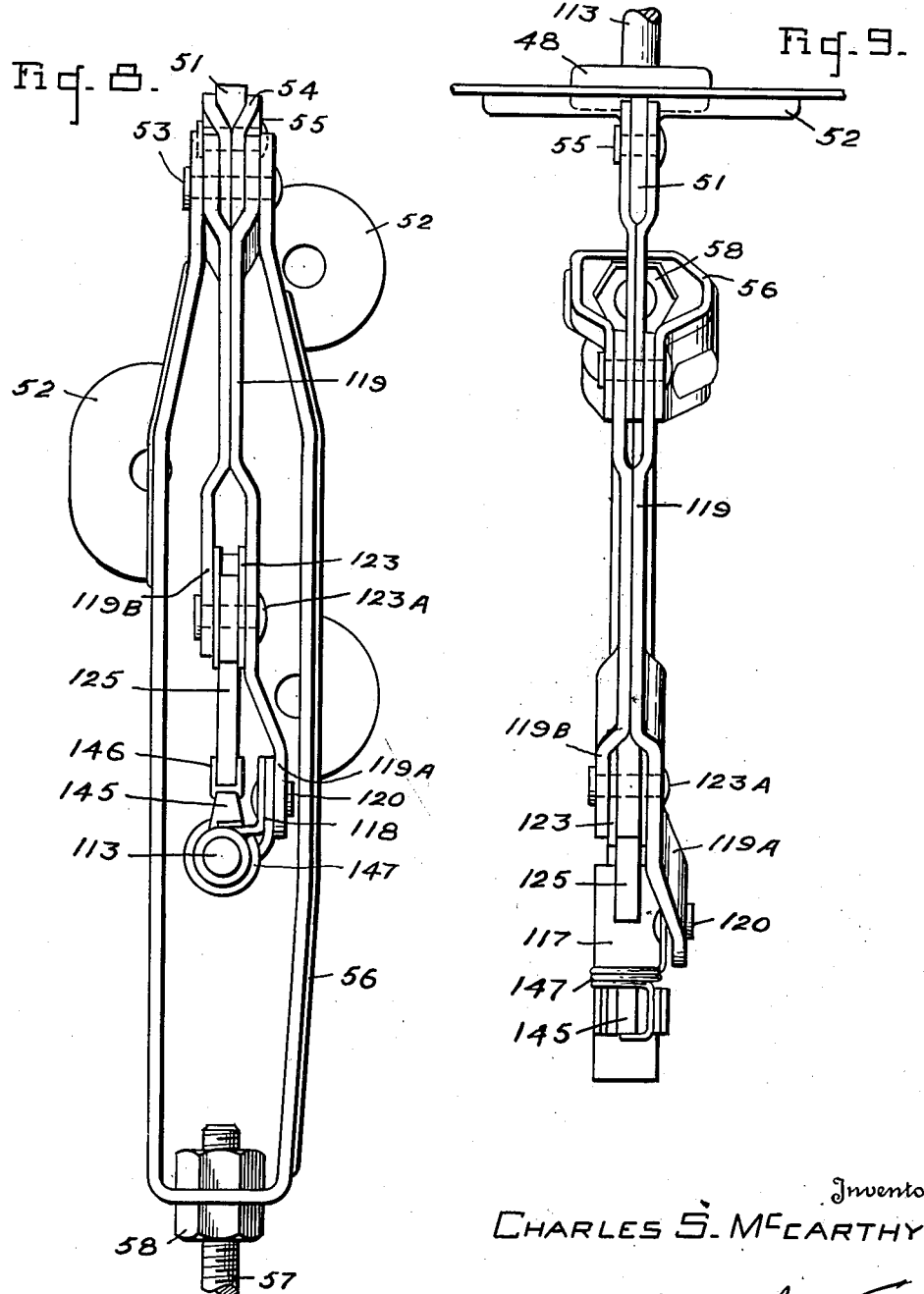
Inventor
CHARLES S. McCARTHY
By George Rex Frye.
ATTORNEY Patented Mar. 4, 1952

2,588,027

UNITED STATES PATENT OFFICE 2,588,027

BRAKE ACTUATOR

Charles S. McCarthy, Birmingham, Mich., assignor to American Forging and Socket Company, Pontiac, Mich., a corporation of Michigan Application September 26, 1949, Serial No. 117,787

7 Claims. (Cl. 188—106)

This invention relates to improvements in brake mechanism for vehicles, particularly motor vehicles, and has for one of its objects the provision of simple, rugged and comparatively inexpensive mechanism for automatically taking up the slack in the brake system due to wear of the brake linings or other parts.

Another object of this invention is the incorporation into the brake system of an adjusting device which will automatically adjust the brake lever mechanism as the brake linings wear.

A further object of this invention is the arrangement of automatic brake adjustment mechanism whereby such automatic adjustment is effected by movements of the foot brake and associated brake lever mechanism, but the benefits thereof are also participated in by the hand brake and associated lever mechanism.

It has long been a desideratum among automotive engineers that the hand brake lever mechanism should require manual adjustment only as often as the foot brake mechanism requires adjustment. The number of such manual adjustments varies with the different makes of cars, averaging three to four foot brake adjustments in the working life of the brake linings, and are necessitated whenever the brake linings wear sufficiently to permit the foot pedal to travel to the vehicle floor in applying the brakes. In the present invention, the hand lever brake mechanism is so connected with the foot brake mechanism that even when the foot brake pedal touches the floor board the hand brake lever will be in the same adjustment as at the start and will apply the brakes with the same amount of effort.

Other objects and advantages will be apparent from the following description taken in connection with the accompanying drawings illustrating presently preferred embodiments of my invention, and wherein similar reference numerals designate similar parts throughout the several views.

In the drawings:

Fig. 1 is a diagrammatic side elevational view of a vehicle brake mechanism constructed in accordance with the present invention.

Fig. 2 is an enlarged detail side elevation of the lower end portion of the hand brake pull rod and associated parts.

Fig. 3 is an enlarged detail end view of the parts shown in Fig. 2.

Fig. 4 is an enlarged vertical sectional view taken along the longitudinal axis of the brake rod, and showing automatic adjusting mechanism and associated parts.

Figs. 5 and 6 are detail cross sectional views taken respectively on the lines 5—5 and 6—6 of Fig. 4.

Fig. 7 is a diagrammatic side elevational view of a modified arrangement of hand brake lever mechanism for actuating the brake rod and automatic adjusting mechanism.

Fig. 8 is an enlarged front elevation of the upper portion of the modified brake lever mechanism shown in Fig. 7, and Fig. 9 is a plan view of the brake lever mechanism of Fig. 7.

Referring now to the drawings, and particularly the embodiment shown in Figs. 1 through 6, the reference numeral 10 designates the floor board and 11 the dash board of an automobile or other suitable vehicle. The brake applying mechanism is mounted mainly on the motor side of and below the dash board, with the foot pedal 12 and hand brake handle rod 13 extending through suitable openings in the floor board into the passenger compartment of the vehicle. Foot brake pedal 12 is pivotally connected to the upper arm of a brake lever 14 fulcrumed, as at 15, upon the vehicle chassis. The forward extremity of a pull rod 16 is also pivotally connected with the brake lever 14 and at its rear extremity is suitably connected with mechanism arranged to apply the brakes at all or some of the vehicle wheels, in accordance with established practice. Springs (not shown) suitably arranged in the brake applying system constantly exert a rearward pull on rod 16, maintaining the brake lever 14 and foot pedal 12 in substantially the positions shown in Fig. 1, except when depressed by the driver. An illustrative embodiment of conventional brake applying mechanism is shown in Fig. 1. The pull rod 16 is pivotally connected at its rear extremity with an upstanding lever arm 70 secured upon an oscillatable cross shaft 71, which in turn is connected through lever arm 72 with the brake rod 73. The rod 73 is connected to a cam 74 that actuates brake shoes 75 to engage brake drum 76 when the brakes are being applied, one or more springs 77 normally holding the brake shoes in contact with cam 74 and inwardly spaced from the brake drum.

The hand brake applying mechanism is shown in the modification illustrated in Figs. 1 through 6 as including the handle rod 13 angularly mounted to extend through the floor board 10 with its handle portion 13A normally below the instrument panel of the vehicle. Adjacent the lower extremity of handle rod 13 a sleeve 17 encircles the handle rod and is provided with a downwardly projecting bracket portion 18 to which is pivotally connected the upper extremity of a lever 19, as by pivot 20 (Figs. 1 and 2). Lever 19 is pivoted at its opposite extremity to the upper arm of auxiliary lever 21, as by pivot pin 22, and intermediate its ends carries a roller 23 adapted to contact and move along the irregular guide track 24 forming the lower extremity of track member 25 supported adjacent the top of bracket 26, by means of which the hand brake lever mechanism is mounted upon the vehicle chassis. The track member 25 with its irregular guide track controls the motion of lever 19 as the handle rod 13 is pulled toward its "on" position or is returned toward its "off" position, as shown in Fig. 1. The irregular guide track is disclosed and claimed in the copending application of Raymond R. Peterson, Serial Number 736,140, filed March 21, 1947, now Patent No. 2,555,811, issued June 5, 1951.

The arrangement of the irregular guide track herein is a modified one, differing in detail from the Peterson disclosure. Auxiliary lever 21 is pivoted intermediate its ends on bracket 26, as by pivot pin 27, and the lower arm of auxiliary lever 21 is preferably channeled adjacent its lower extremity and shaped, substantially as shown in Figs. 1 and 4, with an apertured hemispherical portion 21A, the purpose of which will hereinafter be more fully described.

The automatic adjusting feature of my improved vehicle brake mechanism will now be described. Pull rod 28 is arranged substantially horizontally below the floor board of the vehicle and connects at its rear extremity with suitable mechanism through which power is applied to the brakes on all or some of the vehicle wheels whenever the hand lever brake mechanism is moved to its "on" position. In Fig. 1 the rear extremity of pull rod 28 is shown pivotally connected to lever arm 78 secured on the same oscillatable cross rod 71 that is rocked when the foot brake 12 is depressed, merely for purposes of illustration. In order to apply the brakes, pull rod 28 must travel forwardly or to the left as shown in Fig. 1. At its forward extremity pull rod 28 is formed with a series of annular grooves 29 (Fig. 4) forming a type of buttress thread with the rear face of each thread at substantially right angles to the axis of rod 28 and the forward face of each thread arranged at an angle substantially as shown. In the illustrated embodiment, it will be assumed that these annular grooves or threads are .040" apart, though it will be understood that other sizes and distances may readily be employed. A nut 30, formed of two equal halves (Fig. 5) has on its internal diameter annular grooves shaped and spaced to fit over the grooves 29 on pull rod 28. The two halves of nut 30 are pressed towards each other, as by a circular coil spring 31 fitting in an annular groove 32 in the outer surface of the nut. The forward extremity of nut 30 is preferably hemispherical, for reasons hereinafter explained, and while the rear extremity shows the corner chamfered for clearance, it may readily assume some other shape as desired. A cylinder 33, having an inner diameter slightly greater than that of pull rod 28 and its forward extremity closed, is herein shown with its rear extremity flared outwardly, as at 34 (Fig. 4). The forward portion of nut 30 is provided with a cut-out 35 in its inner face, the forward wall of which is angled so as to substantially fit over the flared portion 34 of cylinder 33. A similar flared cut-out 36 is provided in the inner face of the rear portion of nut 30 with a rearwardly-angled wall fitting over the outwardly-flared forward extremity 37 of tube 38, which surrounds the rear portion of the buttress threads 29 and a considerable portion of pull rod 28 next rearwardly of the buttress threads. Tube 38 has an inner diameter slightly greater than that of pull rod 28 and at its rear extremity is provided with a peripheral flange 38A (Fig. 4), forming a rear abutment for coil spring 39 encircling the rear portion of tube 38 and enclosed within a casing 40 having inwardly turned flanges at its extremities. Casing 40 serves to retain lubricant and exclude dirt and dust from spring 39, and the rear flange 40A of casing 40 is normally pressed against the rear surface of flange 38A by the spring 39, which is preloaded before casing 40 is positioned as shown in Fig. 4. A hood or protective casing 41 is also preferably mounted loosely around nut 30 with the rear portion of such casing 41 formed as a centrally apertured hemispherical portion fitting over the curved rear extremity of nut 30. The forward portion of casing 41 is circumferentially spaced from nut 30 sufficiently to permit separation of the nut sections when desired and at its forward extremity is provided with an inturned flange serving to retain a closure disc 42 (Fig. 4) having a central aperture fitting over cylinder 33. The casing 41 and companion disc 42 are primarily to cover nut 30 and associated parts to keep out dust and dirt and retain desired lubricant, and disc 42 is spaced from nut 30 when the curved rear extremity of nut 30 fits within the rear portion of hood 41, as shown in Fig. 4.

It will be noted that pull rod 28 operates within tube 38 and both pass through the aperture in the hemispherical portion 21A of auxiliary lever 21. It will also be apparent from Figs. 1 and 4 that the hemispherical portion 21A of the lever will substantially fit over the hemispherical rear extremity of nut 30 and its casing 41. The reason for the hemispherical surfaces on lever 21 and adjacent extremity of nut 30 and its casing 41 is twofold. First, it serves as a ball connection so that proper contact is maintained at all times as lever 21 swings through an arc from its pivot 27. Second, while the buttress thread type of grooves 29 on pull rod 28, and cooperating inner grooves in nut 30, may be regarded as sufficient to keep the nut 30 from accidentally moving forwardly along the pull rod 28 when under pressure, the interfitting hemispherical surfaces of lever 21 and rear portion of nut 30 and casing 41 form an additional factor of safety to prevent unwanted opening of the nut, and consequent creeping movement thereof along the pull rod while the greatest pressure is being applied to the pull rod. The dotted line positions of the brake levers and forward portion of the pull rod in Fig. 1 indicate the lift imparted to the forward extremity of pull rod 28 during application of brakes through the handle rod 13.

Below the full line "off" position and dotted line "on" position of lever 21 and pull rod 28 is indicated the total travel of the lower extremity of lever 21 (Fig. 1). This travel indication is divided into two portions, to-wit, that marked "A," which indicates the actual travel utilized for brake application, and "B," which indicates the brake wear take-up travel. In the illustrated embodiment it will be assumed, by way of example, that the amount of movement A of the lower extremity of lever 21 required to apply the brakes when new or readjusted is approximately 7/16", and at maximum brake lining wear, when the foot pedal 12 touches the floor board, the movement of lever 21 then required is 1 7/16". Hence, guide track 24 is designed to cause the lower extremity of lever 21 to move through an arc of 1 7/16". When the brakes are new or readjusted, pull rod 28 is required to move 7/16" to apply the brakes. Since the lower extremity of lever 21 moves a total of 1 7/16" whenever the hand brake is applied, it is necessary that nut 30 be adjusted on pull rod 28 so that lever 21 travels freely for one inch before it contacts casing 41 of nut 30. This travel of one inch will be referred to as free motion.

Pivotally connected at its rear extremity to foot brake lever 14 below its fulcrum 15 (note Fig. 1) is a rod 43 having an eye or loop portion 43A at its forward extremity arranged to encircle tube 38 between the lower extremity of lever 21 and the forward extremity of casing 40 enclosing preloaded spring 39. The position of the loop or eye portion 43A of rod 43 relatively to the forward extremity of casing 40 is such that when the brakes are new or readjusted, movement of the foot brake lever 14 to apply the brakes will merely move loop 43A rearwardly along pull rod 28 until it contacts casing 40, but does not compress spring 39 within such casing. In the illustrated embodiment such clearance between loop 43A and casing 40 when the brakes are new or readjusted is approximately 7/32".

As the brake linings wear, foot pedal 12 will have to travel further toward the floor board 10 to apply the brakes, and such further movement will cause the loop or eye end 43A of rod 43 to contact casing 40 and then move such casing rearwardly to further compress spring 39. The extra movement of loop 43A of rod 43 will be transmitted through the flange 38A to tube 38, causing the flared forward extremity 37 of such tube to open the rear extremity of nut 30, and upon sufficient movement of loop 43A of rod 43 will pull nut 30 rearwardly over one notch of buttress thread 29.

The one inch free motion heretofore noted between nut 30 and lever 21 of the hand brake system will then be cut down by .040", and the pull rod 28 will then be moved 7/16" plus .040" in the actual application of the brakes when the hand brake system is employed.

As the brake linings continue to wear, nut 30 would slowly be adjusted .040" at a time, until at such time as the brake pedal 12 touches the floor board nut 30 would be adjusted to where it is in contact with the hemispherical face 21A of lever 21 in its full line or "off" position in Fig. 1, and the one inch free motion would have been entirely absorbed. In other words, in this worn-out brake condition pull rod 28 would be pulled by lever 21 a total of 1 7/16" in the actual application of the brakes when the hand lever system is employed. Since 7/16" of this travel is required to apply the brakes when the brake linings are new or readjusted, it follows that in the worn-out condition of the brake linings brake lever 21 is pulling rod 28 one inch in preliminarily adjusting the brake bands to the same position that they were in with new or readjusted brake linings.

It is the consensus of opinion among automotive engineers that the motion of the foot brake pedal correctly reflects the wear on the brake linings. In the illustrated embodiment, I have accordingly hooked up the foot brake pedal to control the adjustment which automatically determines the amount of free motion of lever 21, and so the hand brake lever system is automatically adjusted as the brake linings wear and should apply the brakes just as efficiently when the foot brake pedal touches the floor board as when the brakes are new or readjusted.

When the worn brake linings are replaced or the brakes are readjusted so that the foot brake pedal works normally, all that is required in the illutrated embodiment for readjustment of the hand brake lever system is to reposition split nut 30 on pull rod 28. This is accomplished by pulling on cylinder 33 and tube 38. Due to the flared ends 34 and 37 respectively, and cooperating angled surfaces of the cut-outs 35 and 36 in nut 30, the halves of the nut are forced apart, and can then be readily slipped forwardly on the pull rod with ample clearance over buttress threads 29. In making this adjustment, nut 30 in practice is pulled forwardly more than the estimated distance required and then when the foot pedal 12 is next moved to apply the brakes its movement of rod 43 will adjust nut 30 automatically to its original position where there will be substantially one inch free motion between nut 30 and the hemispherical portion 21A of lever 21.

From the above, it will be apparent that efficient and complete application of the brakes through the hand brake lever system may be made, regardless of various adjusted positions of the nut 30 relatively to the normal position of lever 21. Whenever the brakes are applied through the hand brake system, the lower end of the lever 21 is swung through a complete arc of, say 1 7/16", and a portion of its early movement is free motion, until such time as the gradual wear on the brake linings has resulted in the adjustment of nut 30 in constant contact with lever 21. Upon completion of the free motion of lever 21, the remainder of its travel carries with it nut 30 and the pull rod 28. A portion of such latter movement results in repositioning the worn brake linings to where they were when new or readjusted, and the remainder of such latter movement is then utilized for application of the brakes.

In addition, the hand brake lever system shown in Figs. 1 through 6 is controlled to move more rapidly during the free motion of lever 21 than during the period of actual brake application. This is accomplished by use of the irregular contoured guide track 24 in combination with roller 23 and lever 19, which is arranged between the upper end of lever 21 and the handle rod 13. The arrangement is such that lever 19 swings lever 21 more rapidly during the early portion of the movement of the handle rod 13 than during the later movements of such handle rod. As shown in Fig. 1, roller 13 seats in a comparatively low portion or recess in the guide track 24 while the hand brake lever system is in its normal "off" position. When handle rod 13 is pulled to apply the brakes through the hand brake system, roller 23 will first move up an inclined portion of guide track 24 to rapidly swing the lever 21 to thereby quickly take up the slack or lost motion in the hand brake lever system, and then further movement of handle rod 13 will cause roller 23 of lever 19 to ride over a declining portion of guide track 24, whereby a comparatively smooth pull upon handle rod 13 will produce a gradual full application of the brakes without intermediate humps in the effort curve of the brake handle rod 13 as it is drawn rearwardly. The desired curvature of guide track 24 may be determined empirically. As pointed out in the above-mentioned application of Raymond R. Peterson, the effort curve may be plotted and the contour of guide track 24 varied at intermediate places throughout its length so as to vary the lever ratio to eliminate so-called humps, and reduce the amount of effort required from the lever handle rod 13 at any particular point. In the illustrated embodiment, the forward end of the working surface of the guide track 24 is shown as having a relatively short abrupt incline designed to produce the above-described rapid taking up of slack or free motion in the hand brake system. It will be understood, however, that this incline may be more gradual in practice, and varies with different makes and models of automobiles. Beyond such comparatively steep incline the guide track 24 is arranged with a declining portion leading to a depression followed by another slight incline adjacent the rear wall of the guide track where the roller 23 is held while the brakes are in their fully applied positions.

The hand lever brake system is maintained in its "on" position by means of the latching pawl 45 carried by and extending radially beyond the periphery of handle rod 13 (Figs. 2 and 3), and a ratchet tooth 46 (Fig. 1) carried by and extending upwardly from the track member 25 at substantially the point reached by pawl 45 when the brakes are fully applied. A torsional spring 47 encircles handle rod 13 with its ends extending into engagement with pawl 45 and sleeve 17 respectively, whereby handle rod 13 and pawl 45 are yieldingly held in substantially the positions shown in full lines in Figs. 1-3 at all times except when the handle portion 13A is manually turned against the tension of spring 47, or pawl 45 slides up and over the inclined forward portion of tooth 46 during the application of the brakes, into substantially the position shown in dotted lines in Fig. 1.

To release the brakes after their application through the hand lever brake system, it is only necessary to twist handle rod 13 until pawl 45 is rotated out of contact with tooth 46, whereupon the pull of the brake rod 28 will move the brake actuator parts into the full line starting positions shown in Fig. 1, with the brakes fully released. Spring 47 will restore handle rod 13 and associated elements to normal positions when the operator releases his grasp on the handle portion 13A.

In the embodiment illustrated in Figs. 7 through 9, the hand brake actuating means is mounted upon the motor side of dashboard 111, with only the handle 113A and handle rod 113 extending into the passenger compartment of the vehicle, where the handle rod is guided in a nipple 48 fixed below the instrument panel 49. A flexible rubber grommet 50 may be fixed in the dashboard 111 to prevent fumes from entering the passenger compartment, without restricting the handle rod 113 in its sliding movements to apply and release the brake. Adjacent its forward extremity handle rod 113 loosely carries the sleeve 117, but in this embodiment bracket arm 118 of such sleeve extends upwardly and supports pivot pin 120 whereby the forward extremity of lever 119 is connected to the handle rod. As best shown in Fig. 8, bracket arm 118 is offset laterally of the axis of handle rod 113, and lever 119 is formed of two strips of sheet metal of different lengths bent for reinforcement purposes and welded, or otherwise suitably secured, to each other intermediate their ends. The longer strip 119A is pivotally secured to bracket arm 118 by pivot pin 120. A roller 123 is journaled between spaced portions of the two strips forming lever 119, as on pintle 123A mounted in apertures adjacent the lower extremity of the shorter strip 119B of the lever and an intermediate portion of the longer strip 119A (Fig. 8).

Guide track 124 on which roller 123 is adapted to ride is herein shown as forming the upper edge of track member 125, which also carries the standard 51 whereby the track member is secured upon the forward face of dashboard 111, as by welding or riveting through spaced lateral flanges 52 (Fig. 8). The upper edge 124 of track member 125 on which roller 123 is adapted to roll is irregularly contoured to accomplish substantially the same purposes as herein described in connection with the embodiment shown in Figs. 1 through 6. The upper extremity of lever 119 is pivotally connected, as by pivot pin 53, to a shorter lever or link 54, which is pivoted at its other extremity to the upper portion of fixed standard 51, as by pivot pin 55. This arrangement of levers 54 and 119 results in a species of toggle mechanism whereby pivot pin 53 is elevated and swung through an arc substantially as shown in Fig. 7 whenever the handle rod 113 is pulled from its normal "off" position shown in full lines in Fig. 7 to its brake applied or "on" position shown in dotted lines in Fig. 7. This movement of pivot pin 53 is utilized to exert the necessary pull upon pull rod 28 of the brake system to fully apply the brakes. As herein shown, a substantially U-shaped link 56, bent to clear the toggle levers, track member and handle rod (Fig. 8), is pivoted adjacent its upper extremity upon the same pivot pin 53 that connects the levers 54 and 119. A substantially vertically arranged rod 57 is adjustably secured at its upper extremity in the lower portion of link 56, as by adjustable lock nuts 58, and at its lower extremity rod 57 is pivotally connected to the upper arm 59 of a bell-crank lever suitably fulcrumed, as upon pivot pin 60, which is journaled in a fixed portion of the vehicle chassis (not shown). The lower arm 121 of the bell-crank lever is herein shown as substantially vertically arranged when it is in its normal or "off" position (Fig. 7), and the lever arms 59 and 121 are proportioned to effect the desired maximum throw of the lower extremity of lever arm 121 whenever the handle rod 113 is moved rearwardly through its entire range of movement. The lower extremity of lever 121 is provided with an apertured hemispherical portion 121A in the same manner as hereinbefore described in connection with the embodiment illustrated in Figs. 1 through 6. Pull rod 28 carries the same elements as hereinbefore described in connection with my first-described embodiment to-wit, nut 30 with its cover portion 41, cylinder 33, tube 38 and spring 39 with its casing 40. Similarly, the loop or eye end of rod 43 is normally arranged between the forward extremity of casing 40 and the hemispherical portion 121A of lever 121.

The curvature of the upper surface 124 of track 125 may be varied as desired, and is herein shown as including a portion imparting an initial sharp rise, which, however, is not as abrupt as the initial portion of track 24 in the embodiment of Figs. 1 through 6, and another portion arranged to impart a gradual decline to aid in effecting a smooth gradual full application of the brakes. As hereinbefore explained, the profile of the contour of the irregular track surface 124 may vary with different makes and models of vehicles.

In operation, assuming the full line showing in Fig. 7, to depict the "off" position of the hand brake actuating mechanism, the toggle levers 54, 119, being nearly in a straight line position, the brakes are applied by pulling rearwardly upon handle rod 113. Sleeve 117 is moved rearwardly with the handle, thereby causing toggle link 119 to move toward a vertical position to exert a quick pull upon link 56 and rod 57 connecting such link with the bell-crank lever as roller 123 climbs the initial sharp rise portion of irregular guide track 124, thereby quickly taking up any slack or free motion in the brake operating mechanism. Roller 123, after reaching the high point of curved track 124, then moves along the declining surface of the track as shown in Fig. 7, with toggle lever 119 moving into the almost perpendicular position shown in dotted lines in Fig. 7 when the brakes are fully applied. This movement of toggle lever 119 elevates the lower extremity of connecting rod 57 and swings the bell-crank lever 59, 121, to substantially the position shown in dotted lines in Fig. 7, and during such swinging movement the lower arm 121 of the bell-crank lever will swing first through free motion portion B of its arc and then, after contacting the nut 30 on pull rod 28, will continue its movement through the portion A of its arc, during which the actual application of the brakes is secured whenever the brakes are new or readjusted. When the brakes have become worn, and nut 33 automatically adjusted along pull rod 28 in the manner hereinbefore described in connection with the embodiment of Figs. 1 through 6, the free motion portion B of the arc of lever arm 121 will be less, and the nut itself will be moved first to return the worn brake linings to the positions they had had when new or readjusted and finally move the brakes into fully applied position.

In the embodiment shown in Figs. 7 to 9 means are provided for locking the hand brake actuating mechanism in brake applied position in substantially the same manner as in the first described embodiment. A latching pawl 145 is carried by and extends radially upwardly from the forward extremity of handle rod 113, and cooperates with ratchet tooth 146 carried by and depending below track member 125 (Fig. 7) at substantially the point reached by pawl 145 when the brakes are fully applied. A torsional spring 147 encircles handle rod 113 with its ends extending substantially horizontally into engagement with pawl 145 and sleeve 117 respectively, whereby handle rod 113 and pawl 145 are yieldingly held in substantially the positions shown in full lines in Figs. 7 and 8 at all times except when the handle rod is manually turned against the tension of spring 147, or pawl 145 slides along the inclined forward portion of ratchet tooth 146 and into locking engagement with the rear face of such tooth during the application of the brakes, in substantially the position shown in dotted lines in Fig. 7.

To release the brakes, handle rod 113 is partially rotated until pawl 145 is swung out of contact with tooth 146, whereupon the pull exerted from the brake rod 28 will restore the mechanism of the hand brake lever system into the full line starting position of Fig. 7, with the brakes fully released. Torsion spring 147 will restore handle 113 and associated elements to normal positions when the operator's grasp on the handle 113A is released.

While the illustrated embodiments are believed to adequately fulfill the objects and advantages hereinabove stated, it is to be understood that modification and variation may readily be made within the spirit of the invention and scope of the subjoined claims.

Having described my invention, I claim:

1. Motor vehicle brake mechanism including, in combination, brakes having brake linings subject to wear during use, foot operated mechanism for actuating said brakes, including a lever swingable through greater arcs to apply said brakes as the brake linings wear, hand operated brake mechanism for actuating said brakes including a lever swingable through the same arc at each application of the brakes, a pull rod movable by said last-mentioned lever, slack take-up means adjustably mounted on said pull rod, and means connected to and actuated by said first-mentioned lever for automatically adjusting the position of said take-up means in accordance with the extent of arcuate travel of said lever then required for application of the brakes through said foot operated mechanism.

2. Motor vehicle brake mechanism including, in combination, brakes having brake linings subject to wear during use, foot operated mechanism for actuating said brakes, including a lever swingable through greater arcs to apply said brakes as the brake linings wear, hand operated brake mechanism for actuating said brakes including a lever swingable through substantially the same arc at equal application of the brakes by said hand operated mechanism regardless of wear of said brake linings, a pull rod, an adjustable member on said pull rod engageable by said last-mentioned lever during application of said brakes by said hand operated mechanism, and means for adjusting the position of said member along the pull rod when said foot brake mechanism is utilized to apply said brakes including a control rod pivotally connected to said first-mentioned lever.

3. Motor vehicle brake mechanism including, in combination, brakes having brake linings subject to wear during use, foot operated mechanism for actuating said brakes, including a lever swingable through greater arcs to apply said brakes as the brake linings wear, hand operated brake mechanism for actuating said brakes including a lever swingable through substantially the same arc at each application of the brakes by said hand operated mechanism regardless of wear of said brake linings, a pull rod, an adjustable member on said pull rod engageable by said last-mentioned lever during application of said brakes by said hand operated mechanism, and means for adjusting the position of said member along the pull rod connected to and controlled by said first mentioned lever when said foot brake mechanism is utilized to apply said brakes.

4. Motor vehicle brake mechanism including, in combination, brakes having brake linings subject to wear during use, foot operated mechanism for actuating said brakes, including a lever swingable through greater arcs to apply said brakes as the brake linings wear, hand operated brake mechanism for actuating said brakes including a lever swingable through substantially the same arc at each application of the brakes by said hand operated mechanism regardless of wear of said brake linings, a pull rod, an adjustable member on said pull rod engageable by said last-mentioned lever during application of said brakes by said hand operated mechanism, and means for adjusting the position of said member along the pull rod including a control rod pivotally connected to said first-mentioned lever.

5. Motor vehicle brake mechanism including, in combination, brakes having brake linings subject to wear during use, foot operated mechanism for actuating said brakes, including a lever swingable through greater arcs to apply said brakes as the brake linings wear, hand operated brake mechanism for actuating said brakes including a lever swingable through substantially the same arc at each application of the brakes by said hand operated mechanism regardless of wear of said brake linings, a pull rod, an adjustable member on said pull rod engageable by said last-mentioned lever during application of said brakes by said hand operated mechanism, and means for adjusting the position of said member along the pull rod when said foot brake mechanism is utilized to apply said brakes including a control rod pivotally connected to said first-mentioned lever, said adjustable member having a hemispherical portion, and said lever of the hand operated brake mechanism having a hemispherical portion arranged to engage the hemispherical portion of said adjustable member during at least a part of the arcuate travel of such lever when the brakes are applied through said hand operated mechanism.

6. Motor vehicle brake mechanism including, in combination, brakes having brake linings subject to wear during use, hand operated brake mechanism for actuating said brakes including a lever swingable through substantially the same arc at each application of the brakes thereby, a pull rod, an adjustable member on said pull rod engaged by said lever during at least a portion of its arcuate travel in applying the brakes, said adjustable member being spaced from said lever when the brakes are "off" different predetermined distances according to the extent of wear of said brake linings, said pull rod carrying spaced buttress threads, and said adjustable member being formed of sections provided on their inner faces with a plurality of grooves shaped to fit over said buttress threads, and resilient means pressing said sections toward said pull rod.

7. Motor vehicle brake mechanism including, in combination, brakes having brake linings subject to wear during use, hand operated brake mechanism for actuating said brakes including a lever swingable through substantially the same arc at each application of the brakes thereby, a pull rod, an adjustable member on said pull rod engaged by said lever during at least a portion of its arcuate travel in applying the brakes, said adjustable member being spaced from said lever when the brakes are "off" different predetermined distances according to the extent of wear of said brake linings, foot operated brake mechanism for also actuating said brakes, and means under control of said foot operated brake mechanism for adjusting the position of said adjustable member on said pull rod in accordance with the extent of wear of said brake linings.

CHARLES S. McCARTHY.

REFERENCES CITED

The following references are of record in the file of this patent:

UNITED STATES PATENTS

| Number | Name | Date |
|---|---|---|
| 1,655,366 | Hannah | Jan. 3, 1928 |
| 2,006,634 | Evans et al. | July 2, 1935 |
| 2,008,425 | Sawtele | July 16, 1935 |
| 2,110,045 | Kasin | Mar. 1, 1938 |
| 2,187,636 | Story | Jan. 16, 1940 |
| 2,270,600 | Ohlson | Jan. 20, 1942 |